United States Patent
Kamaga et al.

(10) Patent No.: US 11,603,093 B2
(45) Date of Patent: Mar. 14, 2023

(54) INFORMATION PROCESSING APPARATUS, INFORMATION PROCESSING SYSTEM, NON-TRANSITORY COMPUTER READABLE MEDIUM, AND SECURITY VEHICLE

(71) Applicant: TOYOTA JIDOSHA KABUSHIKI KAISHA, Toyota (JP)

(72) Inventors: Ryuichi Kamaga, Nisshin (JP); Kouki Moriya, Nagakute (JP); Yui Ogura, Nagoya (JP); Shintaro Matsutani, Kariya (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 185 days.

(21) Appl. No.: 17/166,748

(22) Filed: Feb. 3, 2021

(65) Prior Publication Data
US 2021/0237718 A1 Aug. 5, 2021

(30) Foreign Application Priority Data
Feb. 3, 2020 (JP) .............................. JP2020-016268

(51) Int. Cl.
*B60W 30/08* (2012.01)
*G05D 1/00* (2006.01)
*B60W 30/18* (2012.01)

(52) U.S. Cl.
CPC ...... *B60W 30/08* (2013.01); *B60W 30/18009* (2013.01); *G05D 1/0022* (2013.01); *G05D 1/0027* (2013.01); *G05D 2201/0213* (2013.01)

(58) Field of Classification Search
None
See application file for complete search history.

(56) References Cited

U.S. PATENT DOCUMENTS

2010/0201146 A1* 8/2010 Alexander ................ B60P 3/14
                                                                  296/24.3
2021/0311162 A1* 10/2021 Mai ......................... G01S 7/415

FOREIGN PATENT DOCUMENTS

JP          S59-29528 A      2/1984
JP          2001-277932 A    10/2001

* cited by examiner

*Primary Examiner* — Alan D Hutchinson
*Assistant Examiner* — Andy Schneider
(74) *Attorney, Agent, or Firm* — Oliff PLC (57) ABSTRACT

An information processing apparatus for guarding at least one vehicle includes a controller. The controller is configured to acquire vehicle information including class information for a class to be held in the at least one vehicle and travel information for the at least one vehicle, determine hazard information attributable to holding of the class based on the acquired vehicle information, and determine security information for guarding the at least one vehicle based on the determined hazard information.

14 Claims, 8 Drawing Sheets

| CLASS INFORMATION | | | |
|---|---|---|---|
| VEHICLE ID | TYPE OF CLASS | NUMBER OF PEOPLE | INTERNAL INFORMATION |
| A | COOKING CLASS | MEN : 0<br>WOMEN : 10 | MONITORING IMAGE |
| B | COOKING CLASS | MEN : 10<br>WOMEN : 0 | GAS CONCENTRATION |
| C | COOKING CLASS | MEN : 5<br>WOMEN : 5 | AUDIO |
| D | MUSIC CLASS | MEN : 2<br>WOMEN : 2 | MONITORING IMAGE |
| ⋮ | ⋮ | ⋮ | ⋮ |

| CLASS INFORMATION | | | |
|---|---|---|---|
| VEHICLE ID | TYPE OF CLASS | NUMBER OF PEOPLE | INTERNAL INFORMATION |
| A | COOKING CLASS | MEN : 0<br>WOMEN : 10 | MONITORING IMAGE |
| B | COOKING CLASS | MEN : 10<br>WOMEN : 0 | GAS CONCENTRATION |
| C | COOKING CLASS | MEN : 5<br>WOMEN : 5 | AUDIO |
| D | MUSIC CLASS | MEN : 2<br>WOMEN : 2 | MONITORING IMAGE |
| ⋮ | ⋮ | ⋮ | ⋮ |

FIG. 4

| HAZARD INFORMATION | | |
|---|---|---|
| VEHICLE ID | TYPE OF HAZARDOUS EVENT | DEGREE OF RISK |
| A | FIRE | LOW |
| B | FIRE | HIGH |
| C | TROUBLE BETWEEN OCCUPANTS | MEDIUM |
| D | ACCIDENT INVOLVING INSTRUMENT | LOW |
| ⋮ | ⋮ | ⋮ |

FIG. 5

| VEHICLE ID | PRIORITY | SECURITY INFORMATION ||||| |
| --- | --- | --- | --- | --- | --- | --- |
| | | DEPLOYMENT OF SECURITY VEHICLE | SECURITY AREA | DISTANCE | TYPE OF SECURITY VEHICLE | SECURITY VEHICLE ID |
| A | LOW | YES | 5 KM RADIUS | 5 km | FIRE ENGINE | X |
| B | HIGH | YES | 5 KM RADIUS | 10 m | FIRE ENGINE | X |
| C | MEDIUM | YES | 5 KM RADIUS | 2.5 km | POLICE VEHICLE | Y |
| D | LOW | YES | 5 KM RADIUS | 5 km | AMBULANCE | Z |
| ... | ... | ... | ... | ... | ... | ... |

INFORMATION PROCESSING APPARATUS, INFORMATION PROCESSING SYSTEM, NON-TRANSITORY COMPUTER READABLE MEDIUM, AND SECURITY VEHICLE

CROSS-REFERENCE TO RELATED APPLICATION

The present application claims priority to Japanese Patent Application No. 2020-016268, filed Feb. 3, 2020, the entire contents of which are incorporated herein by reference.

TECHNICAL FIELD

The present disclosure relates to an information processing apparatus, an information processing system, a program, and a security vehicle.

BACKGROUND

Technologies related to mobile vehicles for holding classes inside vehicles are known. For example, patent literature (PTL) 1 discloses a mobile classroom vehicle provided with a space for musical instrument performance in the vehicle and musical instruments installed in the space. Music lessons can be held in the vehicle using the instruments.

CITATION LIST

Patent Literature

PTL 1: JP 2001-277932 A

SUMMARY

Various hazardous events, such as fires and trouble between occupants, may occur when a class is held in a mobile vehicle, including not only the above-mentioned music classes but also cooking classes or the like. Therefore, technologies for ensuring the safety of classes held within a vehicle are desired. PTL 1 does not sufficiently take the assurance of safety in such a class held in a vehicle into consideration.

It would be helpful to ensure the safety of classes to be held within a vehicle.

An information processing apparatus according to an embodiment of the present disclosure is an information processing apparatus for guarding at least one vehicle, the information processing apparatus including a controller configured to acquire vehicle information including class information for a class to be held in the at least one vehicle and travel information for the at least one vehicle, determine hazard information attributable to holding of the class based on the acquired vehicle information, and determine security information for guarding the at least one vehicle based on the determined hazard information.

A program according to an embodiment of the present disclosure is configured to cause an information processing apparatus for guarding at least one vehicle, to execute operations including acquiring vehicle information including class information for a class to be held in the at least one vehicle and travel information for the at least one vehicle; determining hazard information attributable to holding of the class based on the acquired vehicle information, and determining security information for guarding the at least one vehicle based on the determined hazard information.

A security vehicle in accordance with an embodiment of the present disclosure is a security vehicle for guarding at least one vehicle subject to security using an information processing apparatus, the security vehicle including a controller configured to acquire vehicle information including class information for a class to be held in the at least one vehicle and travel information for the at least one vehicle, acquire security information for guarding the at least one vehicle, determined by the information processing apparatus based on the vehicle information, and control the security vehicle to guard the at least one vehicle in accordance with the acquired vehicle information and the acquired security information.

According to an information processing apparatus, an information processing system, a non-transitory computer readable medium, and a security vehicle according to an embodiment of the present disclosure, the safety of a class to be held within a vehicle can be ensured.

DETAILED DESCRIPTION

An embodiment of the present disclosure will be described below, with reference to the drawings.

Figure 1:
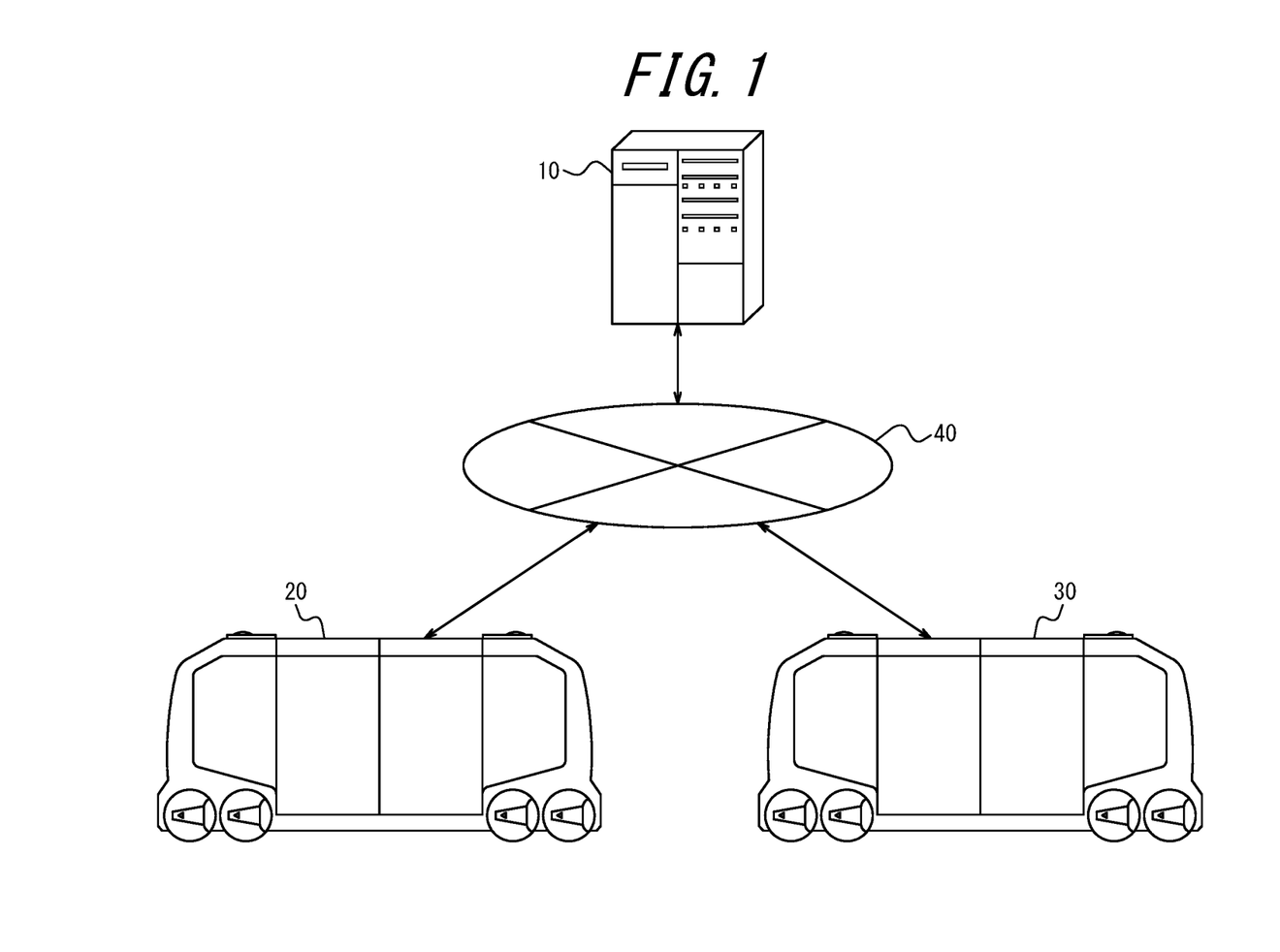
FIG. 1 is a configuration diagram illustrating a configuration of an information processing system including an information processing apparatus according to an embodiment of the present disclosure.

FIG. 1 is a configuration diagram illustrating a configuration of an information processing system 1 that includes an information processing apparatus 10 according to an embodiment of the present disclosure. Referring to FIG. 1, an outline of the information processing system 1 that includes the information processing apparatus 10 according to an embodiment of the present disclosure is primarily described. The information processing system 1 includes a vehicle 20 and a security vehicle 30 in addition to the information processing apparatus 10. For the sake of explanation, only one of each of the information processing apparatus 10, the vehicle 20, and the security vehicle 30 is illustrated in FIG. 1, but two or more of each of the information processing apparatus 10, the vehicle 20, and the security vehicle 30 may be included in the information processing system 1.

The information processing apparatus 10 and the security vehicle 30 are each connected to a network 40, examples of which include a mobile object communication network and the Internet, together with the vehicle 20, in which the class is held, so as to communicate with each other. As used herein, a "class" includes, for example, any event in which instruction or education is provided from a teacher to a student. The "classes" may include any kind of classes, such as cooking classes, music classes, dance classes, or English conversation classes.

At least part of the information processing system 1 is used for providing a mobility service. Service providers can each provide mobility services, such as mobile classes, using the vehicle 20. Each class held in the vehicle 20 may have one or more teachers and one or more students.

The information processing apparatus 10 is used to guard the vehicle 20. The information processing apparatus 10 is a single server apparatus or a plurality of server apparatuses that can communicate with each other. The information processing apparatus 10 is not limited to these, and may be any general purpose electronic device such as a personal computer (PC) or a smartphone, or may be any other electronic device that is dedicated to the information processing system 1.

The vehicle 20 is any vehicle to be guarded using the information processing apparatus 10. The vehicle 20 is, for example, an automobile. The vehicle 20 may be any vehicle in which passengers can ride and in which a class can be held. The vehicle 20 may be moving or stationary while the class is being held. The vehicle 20 is, for example, a vehicle that performs autonomous driving. The autonomous driving may include any level from Level 1 to Level 5 as defined by the Society of Automotive Engineers (SAE), for example, but is not limited to these, and may be defined in any way. The vehicle 20 is not limited to a vehicle that performs autonomous driving and may be any vehicle driven by a driver.

The security vehicle 30 is any security vehicle that guards the vehicle 20 to be guarded using the information processing apparatus 10. The security vehicle 30 is, for example, an automobile. The security vehicle 30 is not limited to this example and may be any vehicle capable of guarding the vehicle 20 in which the class is held. One security vehicle 30 is deployed, for example, for one vehicle 20. This example is not limiting, and one security vehicle 30 may be deployed for a plurality of vehicles 20. Conversely, a plurality of security vehicles 30 may be deployed for one vehicle 20. In accordance with the movement of the vehicle 20 to be guarded, the security vehicle 30 may, for example, move while maintaining a predetermined distance from the vehicle 20 to be guarded or may be stationary at a predetermined location, for example, regardless of movement of the vehicle 20 to be guarded. The security vehicle 30 is, for example, a vehicle that performs autonomous driving. The autonomous driving may include any level from Level 1 to Level 5 as defined by the Society of Automotive Engineers (SAE), for example, but is not limited to these, and may be defined in any way. The security vehicle 30 is not limited to a vehicle that performs autonomous driving and may be any vehicle that is driven by a driver.

To summarize one embodiment, the information processing apparatus 10 for guarding the vehicle 20 acquires vehicle information that includes class information for the class held in the vehicle 20 and travel information for the vehicle 20. As used herein, the "class information" includes, for example, prior information for before the class is held, including the type of class, the number of people in the class, and the like, and real-time internal information associated with holding of the class, including monitoring images and sensor information for the inside of the vehicle 20 in which the class is being held. This information is included in the class information in association with identification (ID) information for the vehicle 20. As used herein, the "travel information" includes prior information and real-time information associating the travel position of the vehicle 20 with time, for example. The information processing apparatus 10 acquires the vehicle information from the vehicle 20 via the network 40, for example. This example is not limiting, and the information processing apparatus 10 may acquire the vehicle information from any other device connected to the network 40.

Based on the acquired vehicle information, the information processing apparatus 10 determines hazard information attributable to holding of the class. As used herein, the "hazard information" includes any information related to various hazardous events, such as a fire or trouble between occupants, that may occur within the vehicle 20. For example, the "hazard information" includes the type of hazardous event and the degree of risk indicating the likelihood of the hazardous event occurring. This information is included in the hazard information in association with the ID information for the vehicle 20.

The degree of risk included in the hazard information may be calculated based on any index. For example, the degree of risk attributable to the opening of a class within the vehicle 20 is represented by one of three levels: "low", "medium", and "high". This example is not limiting, and the degree of risk may be represented by a numerical value from 0 to 100, for example. The degree of risk may thus be represented by a numerical value within any appropriate numerical range. The larger the degree of risk, the higher the likelihood that a hazardous event will occur. Conversely, the smaller the degree of risk, the lower the likelihood that a hazardous event will occur.

The information processing apparatus 10 determines the security information for guarding the vehicle 20 based on the determined hazard information. As used herein, the "security information" includes, for example, any information required to guard the vehicle 20. For example, the "security information" includes the security priority, whether a security vehicle 30 has been deployed, a security area for the security vehicle 30 centered on the vehicle 20, the distance between the vehicle 20 and the security vehicle 30 within the security area, the type of security vehicle 30 to be deployed, and the ID of the security vehicle 30. These items are determined for each vehicle 20 and are included in the security information in association with the ID information for the vehicle 20.

The security priority included in the security information may be calculated based on any index. For example, the security priority is represented by one of three levels: "low", "medium", and "high". This example is not limiting, and the priority may be represented by a numerical value from 0 to 100, for example. The priority may thus be represented by a numerical value within any appropriate numerical range.

The higher the priority, the higher the need for security. Conversely, the lower the priority, the lower the need for security.

Figure 2:
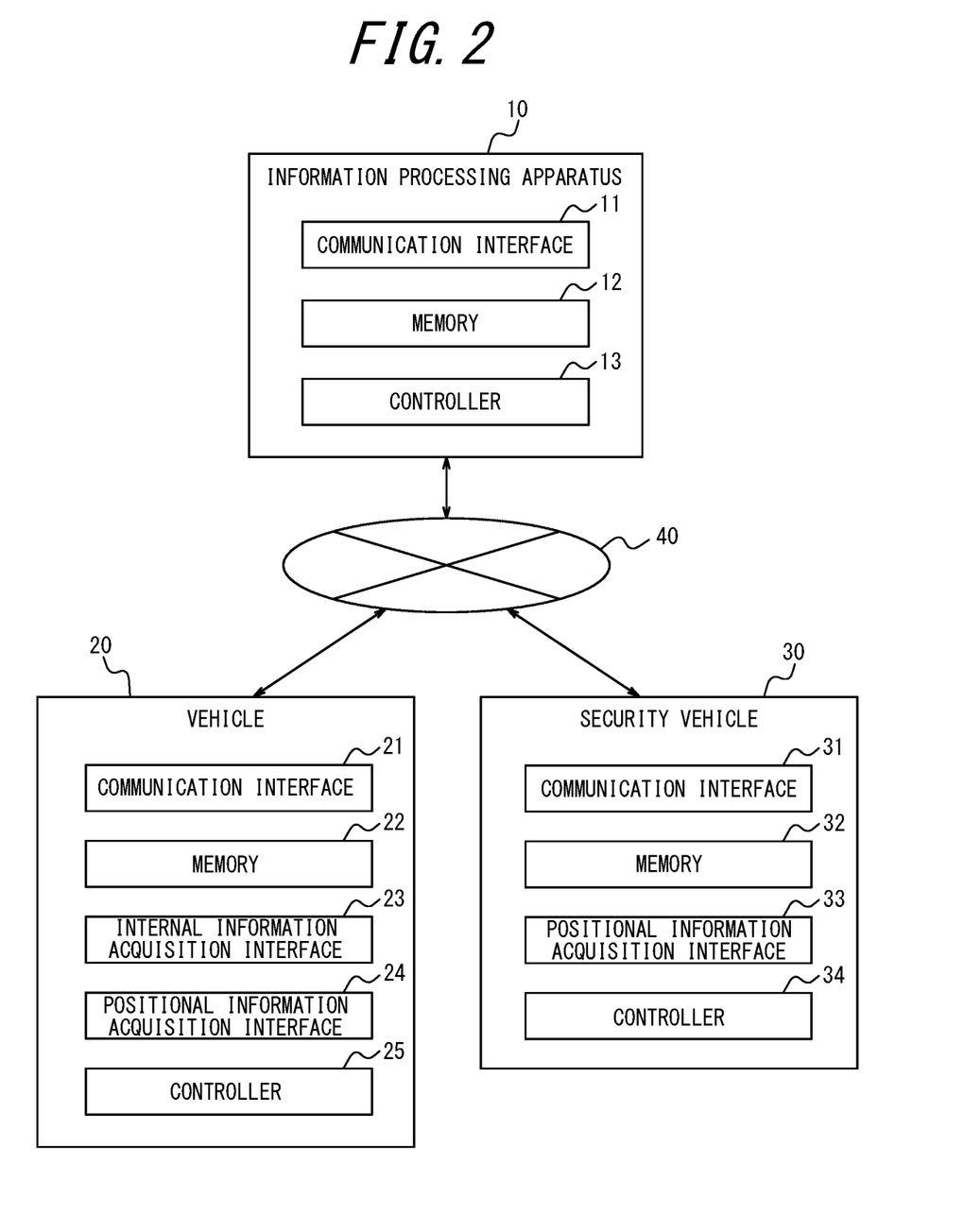
FIG. 2 is functional block diagram illustrating schematic configurations of the information processing apparatus, the vehicle, and the security vehicle of FIG. 1.

Next, referring to FIG. 2, the configuration of each of the information processing apparatus 10, the vehicle 20, and the security vehicle 30 included in the information processing system 1 is described. FIG. 2 is a functional block diagram illustrating schematic configurations of the information processing apparatus 10, the vehicle 20, and the security vehicle 30 of FIG. 1.

As illustrated in FIG. 2, the vehicle 20 includes a communication interface 21, a memory 22, an internal information acquisition interface 23, a positional information acquisition interface 24, and a controller 25. The communication interface 21, the memory 22, the internal information acquisition interface 23, the positional information acquisition interface 24, and the controller 25 are connected via an in-vehicle network or a dedicated line such as a controller area network (CAN), for example, so as to communicate with each other.

The communication interface 21 includes a communication module connected to the network 40. For example, the communication interface 21 may include a communication module compliant with mobile communication standards such as the 4th Generation (4G) and the 5th Generation (5G) standards. In an embodiment, the vehicle 20 is connected to the network 40 via the communication interface 21. The communication interface 21 transmits and receives various information via the network 40.

The memory 22 is, for example, a semi-conductor memory, a magnetic memory, an optical memory, or the like, but is not limited to these. The memory 22 may function as, for example, a main memory, an auxiliary memory, or a cache memory. The memory 22 stores any data used in the operation of the vehicle 20. For example, the memory 22 may store a system program, an application program, various types of information received by the communication interface 21, and the like. The information stored in the memory 22 may be updated with information received from the network 40 via the communication interface 21, for example.

The internal information acquisition interface 23 includes a module capable of acquiring any information regarding the space in the vehicle 20 in which the class is held. For example, the internal information acquisition interface 23 may include an imaging module capable of capturing images, as monitoring images, of the space in the vehicle 20 where the class is held. For example, the internal information acquisition interface 23 may include a sensor module capable of measuring the gas concentration, as sensor information, for the space in the vehicle 20 where the class is held. The internal information acquisition interface 23 may, for example, include a microphone module capable of recording sound, as sensor information, in the space in the vehicle 20 in which the class is held.

The positional information acquisition interface 24 includes at least one receiver compliant with a satellite positioning system. For example, the positional information acquisition interface 24 may include a Global Positioning System (GPS) receiver. The positional information acquisition interface 24 acquires the measured position of the vehicle 20 as the positional information. The positional information includes, for example, an address, a latitude, a longitude, and an altitude. The positional information acquisition interface 24 may acquire the positional information for the vehicle 20 continually, periodically, or non-periodically.

The controller 25 includes at least one processor. The "processor" is a general purpose processor or a dedicated processor that is dedicated to specific processing in an embodiment but is not limited to these. For example, the controller 25 may include an electronic control unit (ECU). The controller 25 is connected to the components of the vehicle 20 so as to communicate with each component and controls operation of the entire vehicle 20.

The controller 25 executes vehicle control for the vehicle 20 based, for example, on control information acquired from the information processing apparatus 10 or any other apparatus connected over the network 40. A non-limiting example of the vehicle control is autonomous driving to a destination. The controller 25 acquires various driving information pertaining to the vehicle 20 from the ECU or the like, for example. Examples of the "driving information" as used herein include speed, acceleration, brake state, and autonomous driving state.

The controller 25 transmits vehicle information, including class information for the class and travel information for the vehicle 20, to the information processing apparatus 10 via the communication interface 21. For example, the controller 25 transmits the internal information for the vehicle 20 in which the class is held to the information processing apparatus 10 as class information in real time via the communication interface 21. The controller 25 transmits travel information, for example, for the vehicle 20 acquired via the positional information acquisition interface 24 to the information processing apparatus 10 in real time via the communication interface 21.

Via the communication interface 21, the controller 25 receives hazard information attributable to holding of the class, as determined by the information processing apparatus 10 based on the vehicle information, from the information processing apparatus 10.

The controller 25 receives the security information, determined by the information processing apparatus 10, from the information processing apparatus 10 via the communication interface 21. For example, as security information, the controller 25 receives, from the information processing apparatus 10 via the communication interface 21, deployment information for the security vehicle 30 deployed based on the travel information for the vehicle 20 to guard the vehicle 20. The deployment information is determined by the information processing apparatus 10. As used herein, the "deployment information" includes, among the security information, the security area of the security vehicle 30 centering on the vehicle 20, the distance between the vehicle 20 and the security vehicle 30 in the security area, the type of security vehicle 30 to be deployed, and the ID information for the security vehicle 30, for example.

As illustrated in FIG. 2, the security vehicle 30 includes a communication interface 31, a memory 32, a positional information acquisition interface 33, and a controller 34. The communication interface 31, the memory 32, the positional information acquisition interface 33, and the controller 34 are connected via an in-vehicle network or a dedicated line such as a CAN, for example, so as to communicate with each other.

The communication interface 31 includes a communication module connected to the network 40. For example, the communication interface 31 may include a communication module compliant with mobile communication standards such as the 4G and the 5G standards. In an embodiment, the security vehicle 30 is connected to the network 40 via the communication interface 31. The communication interface 31 transmits and receives various information via the network 40.

The memory 32 is, for example, a semi-conductor memory, a magnetic memory, an optical memory, or the like, but is not limited to these. The memory 32 may function as, for example, a main memory, an auxiliary memory, or a cache memory. The memory 32 stores any data used in the operation of the security vehicle 30. For example, the memory 32 may store a system program, an application program, various types of information received by the communication interface 31, and the like. The information stored in the memory 32 may be updated with information received from the network 40 via the communication interface 31, for example.

The positional information acquisition interface 33 includes at least one receiver compliant with a satellite positioning system. For example, the positional information acquisition interface 33 may include a GPS receiver. The positional information acquisition interface 33 acquires the measured position of the security vehicle 30 as the positional information. The positional information includes, for example, an address, a latitude, a longitude, and an altitude. The positional information acquisition interface 33 may acquire the positional information for the security vehicle 30 continually, periodically, or non-periodically.

The controller 34 includes at least one processor. The "processor" is a general purpose processor or a dedicated processor that is dedicated to specific processing in an embodiment but is not limited to these. For example, the controller 34 may include an ECU. The controller 34 is connected to the components of the security vehicle 30 so as to communicate with each component and controls operation of the entire security vehicle 30.

Based on the control information obtained from the information processing apparatus 10, for example, the controller 34 executes vehicle control for the security vehicle 30. The vehicle control is, for example, autonomous driving within the security area centered on the vehicle 20, but this example is not limiting. The controller 34 acquires various driving information pertaining to the security vehicle 30 via the ECU, for example, and transmits the driving information to the information processing apparatus 10 via the communication interface 31.

The controller 34 transmits travel information for the security vehicle 30, acquired via the positional information acquisition interface 33, in real time to the information processing apparatus 10 via the communication interface 31, for example.

The controller 34 acquires vehicle information for the vehicle 20. For example, the controller 34 receives the vehicle information for the vehicle 20 via the communication interface 31 from the information processing apparatus 10 or the vehicle 20. The controller 34 receives hazard information attributable to holding of the class, as determined by the information processing apparatus 10 based on the vehicle information, from the information processing apparatus 10 via the communication interface 31.

The controller 34 acquires security information, determined by the information processing apparatus 10 based on the vehicle information, for guarding the vehicle 20. For example, the controller 34 receives security information, determined by the information processing apparatus 10 using the hazard information determined based on the vehicle information, from the information processing apparatus 10 via the communication interface 31. For example, the controller 34 receives deployment information, determined by the information processing apparatus 10 for guarding the vehicle 20, as security information from the information processing apparatus 10 via the communication interface 31.

The controller 34 controls the security vehicle 30 based on the control information acquired from the information processing apparatus 10 so as to guard the targeted vehicle 20 in accordance with the acquired vehicle information and security information. For example, the controller 34 moves or stops the security vehicle in accordance with the travel information for the vehicle 20 so that the security vehicle 30 is included in the security area for the security vehicle 30 centered on the vehicle 20, as included in the acquired deployment information.

For example, the controller 34 moves or stops the security vehicle 30 so as to maintain a certain distance, included in the acquired deployment information, between the vehicle 20 and the security vehicle 30 within the security area. For example, the controller 34 moves or stops the security vehicle 30 so as to maintain the distance determined by the information processing apparatus 10 in accordance with the security priority included in the security information.

The controller 34 may, for example, move or stop the security vehicle 30 to maintain the maximum distance, determined by the information processing apparatus 10, between the vehicle 20 and the security vehicle 30 within the security area when the security priority is "low". The controller 34 may, for example, move or stop the security vehicle 30 to maintain a certain distance, determined by the information processing apparatus 10, between the vehicle 20 and the security vehicle 30 so that the security vehicle 30 is traveling or parked next to the vehicle 20 when the security priority is "high". The controller 34 may, for example, move or stop the security vehicle 30 to maintain a certain distance, determined by the information processing apparatus 10, between the vehicle 20 and the security vehicle 30 so that the security vehicle 30 is located near the middle point between the vehicle 20 and the edge of the security area when the security priority is "medium".

For example, the controller 34 moves the security vehicle 30 to the position of the vehicle 20 in accordance with the travel information for the vehicle 20 when the degree of risk, determined in real time by the information processing apparatus 10, exceeds a predetermined level based on the internal information included in the class information. For example, the controller 34 may move the security vehicle 30 to the position of the vehicle 20 in accordance with the travel information for the vehicle 20 when the degree of risk exceeds "medium" and becomes "high". For example, the controller 34 may move the security vehicle 30 to the position of the vehicle 20 in accordance with the travel information for the vehicle 20 when the degree of risk represented by a numerical value within any appropriate numerical range exceeds a threshold.

For example, the controller 34 controls the security vehicle 30 to eliminate a hazardous event at the position of the vehicle 20 when the information processing apparatus 10 judges that a hazardous event envisioned in relation to the hazard information has actually occurred based on the internal information included in the class information. If the hazardous event is a fire, for example, and the type of the security vehicle 30 is a fire engine, the controller 34 controls the security vehicle 30 to extinguish the fire occurring in the vehicle 20. For example, if the hazardous event is trouble between occupants, and the type of the security vehicle 30 is a police vehicle, the controller 34 guides the police officer riding in the security vehicle 30 to the vehicle 20 while providing the police officer with the audio of the space in the vehicle 20 where the class is held as the internal information. If the hazardous event is an accident involving an instrument, for example, and the type of the security vehicle 30 is an ambulance, the controller 34 guides the ambulance staff on board the security vehicle 30 to the vehicle 20 while providing the ambulance staff with the monitoring images in the vehicle 20 where the class is held.

Next, the configuration of the information processing apparatus 10 included in the information processing system 1 will be primarily described. As illustrated in FIG. 2, the information processing apparatus 10 includes a communication interface 11, a memory 12, and a controller 13.

The communication interface 11 includes a communication module connected to the network 40. For example, the communication interface 11 may include a communication module that corresponds to a mobile object communication standard, such as 4G and 5G, or an Internet standard. In an embodiment, the information processing apparatus 10 is connected to the network 40 via the communication interface 11. The communication interface 11 transmits and receives various information via the network 40.

The memory 12 is, for example, a semi-conductor memory, a magnetic memory, an optical memory, or the like, but is not limited to these. The memory 12 may function as, for example, a main memory, an auxiliary memory, or a cache memory. The memory 12 stores any information used in operation of the information processing apparatus 10. For example, the memory 12 may store a system program, an application program, various types of information received by the communication interface 11, and the like. The information stored in the memory 12 may be updated with information received from the network 40 via the communication interface 11, for example.

The controller 13 includes at least one processor. The "processor" is a general purpose processor or a dedicated processor that is dedicated to specific processing in an embodiment but is not limited to these. The controller 13 is connected to each component included in the information processing apparatus 10 so as to communicate with each component and controls operation of the entire information processing apparatus 10.

The controller 13 acquires vehicle information for the vehicle 20. For example, the controller 13 receives vehicle information for the vehicle 20, prior to holding of the class, via the communication interface 11 from the vehicle 20 or any other apparatus connected to the network 40. For example, the controller 13 receives vehicle information for the vehicle 20 from the vehicle 20 via the communication interface 11 in real time while the class is being held. More specifically, the controller 13 acquires the internal information for the vehicle 20 in which the class is being held in real time from the vehicle 20.

Figure 3:
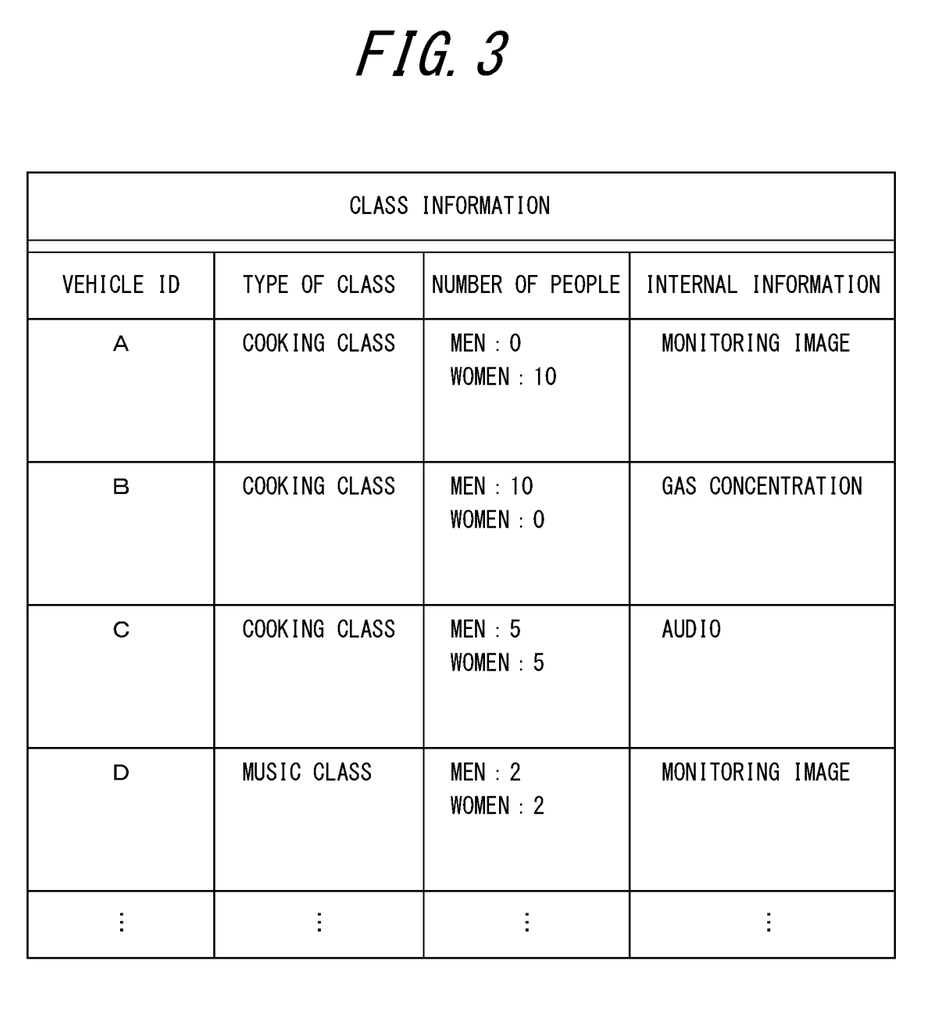
FIG. 3 illustrates an example of class information among vehicle information acquired by the controller of FIG. 2.

FIG. 3 is a diagram illustrating an example of class information among the vehicle information acquired by the controller 13 of FIG. 2. Referring to FIG. 3, an example of the class information acquired by the controller 13 is described in greater detail.

The controller 13 acquires, in advance or in real time, the information that the type of class held in the vehicle 20 with vehicle ID "A" is a cooking class. The controller 13 acquires, in advance or in real time, the information that the number of people is 0 men and 10 women. In real time, the controller 13 acquires, as internal information, the monitoring images acquired by the internal information acquisition interface 23 capturing images of the space in the vehicle 20 where the class is being held.

The controller 13 acquires, in advance or in real time, the information that the type of class held in the vehicle 20 with vehicle ID "B" is a cooking class. The controller 13 acquires, in advance or in real time, the information that the number of people is 10 men and 0 women. In real time, the controller 13 acquires, as internal information, the sensor information acquired by the internal information acquisition interface 23 measuring the gas concentration of the space in the vehicle 20 where the class is being held.

The controller 13 acquires, in advance or in real time, the information that the type of class held in the vehicle 20 with vehicle ID "C" is a cooking class. The controller 13 acquires, in advance or in real time, the information that the number of people is 5 men and 5 women. In real time, the controller 13 acquires, as internal information, the sensor information acquired by the internal information acquisition interface 23 recording audio in the space in the vehicle 20 where the class is being held.

The controller 13 acquires, in advance or in real time, the information that the type of class held in the vehicle 20 with vehicle ID "D" is a music class. The controller 13 acquires, in advance or in real time, the information that the number of people is 2 men and 2 women. In real time, the controller 13 acquires, as internal information, the monitoring images acquired by the internal information acquisition interface 23 capturing images of the space in the vehicle 20 where the class is being held.

Based on the acquired vehicle information, the controller 13 determines the hazard information attributable to holding of the class. For example, based on the acquired class information, the controller 13 determines the degree of risk attributable to holding of the class as the hazard information.

Figure 4:
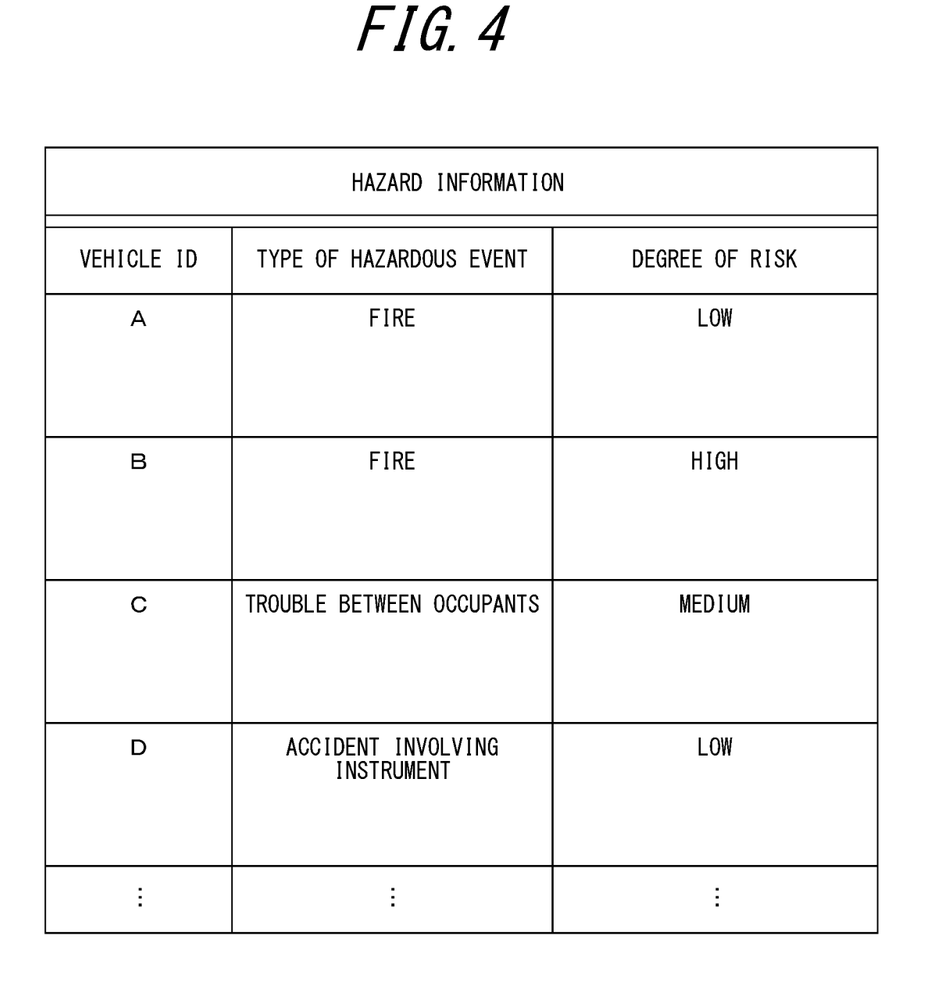
FIG. 4 illustrates an example of hazard information determined by the controller of FIG. 2.

FIG. 4 is a diagram illustrating an example of the hazard information determined by the controller 13 of FIG. 2. Referring to FIG. 4, an example of the hazard information determined by the controller 13 is described in greater detail.

The controller 13 determines, in advance or in real time, that the type of hazardous event that may occur in the vehicle 20 is a "fire" based on the type of class held in the vehicle 20 with vehicle ID "A" being a cooking class. The controller 13 may determine, in real time, that the type of hazardous event that may occur in the vehicle 20 in real time is a "fire" based on the monitoring images in the vehicle 20 acquired in real time as the internal information. The controller 13 determines, in advance or in real time, that the degree of risk is "low" in accordance with the number of people of the cooking class. The controller 13 may determine, in real time, that the degree of risk is "low" based on the monitoring images in the vehicle 20 acquired in real time as the internal information.

The controller 13 determines, in advance or in real time, that the type of hazardous event that may occur in the vehicle 20 is a "fire" based on the type of class held in the vehicle 20 with vehicle ID "B" being a cooking class. The controller 13 may determine, in real time, that the type of hazardous event that may occur in the vehicle 20 in real time is a "fire" based on the sensor information in the vehicle 20 acquired in real time as the internal information. The controller 13 determines, in advance or in real time, that the degree of risk is "high" in accordance with the number of people of the cooking class. The controller 13 may determine, in real time, that the degree of risk is "high" based on the sensor information in the vehicle 20 acquired in real time as the internal information.

The controller 13 determines, in advance or in real time, that the type of hazardous event that may occur in the vehicle 20 is "trouble between occupants" based on the type of class held in the vehicle 20 with vehicle ID "C" being a cooking class. The controller 13 may determine, in real time, that type of hazardous event that may occur in the vehicle 20 is trouble between occupants based on the sensor information in the vehicle 20 acquired in real time as the internal information. The controller 13 determines, in advance or in real time, that the degree of risk is "medium" in accordance with the number of people of the cooking class. The controller 13 may determine, in real time, that the degree of risk is "medium" based on the sensor information in the vehicle 20 acquired in real time as the internal information.

The controller 13 determines, in advance or in real time, that the type of hazardous event that may occur in the vehicle 20 is an "accident involving an instrument" based on the type of class held in the vehicle 20 with vehicle ID "D" being a music class. The controller 13 may determine, in real time, the type of hazardous event that may occur in the vehicle 20 is an "accident involving an instrument" based on the monitoring images in the vehicle 20 acquired in real time as the internal information. The controller 13 determines, in advance or in real time, that the degree of risk is "low" in accordance with the number of people of the music class. The controller 13 may determine, in real time, that the degree of risk is "low" based on the monitoring images in the vehicle 20 acquired in real time as the internal information.

Based on the determined hazard information, the controller 13 determines the security information for guarding the vehicle 20. For example, the controller 13 determines the priority of each vehicle for guarding a plurality of vehicles 20 in accordance with the determined degree of risk as the security information. For example, based on the hazard information, the controller 13 determines deployment information for the security vehicle 30 deployed to guard the vehicle 20 based on the travel information for the vehicle 20 as the security information. For example, the controller 13 determines the distance between the vehicle 20 and the security vehicle 30 within the security area in accordance with the determined degree of risk and the security priority included in the security information.

Figure 5:
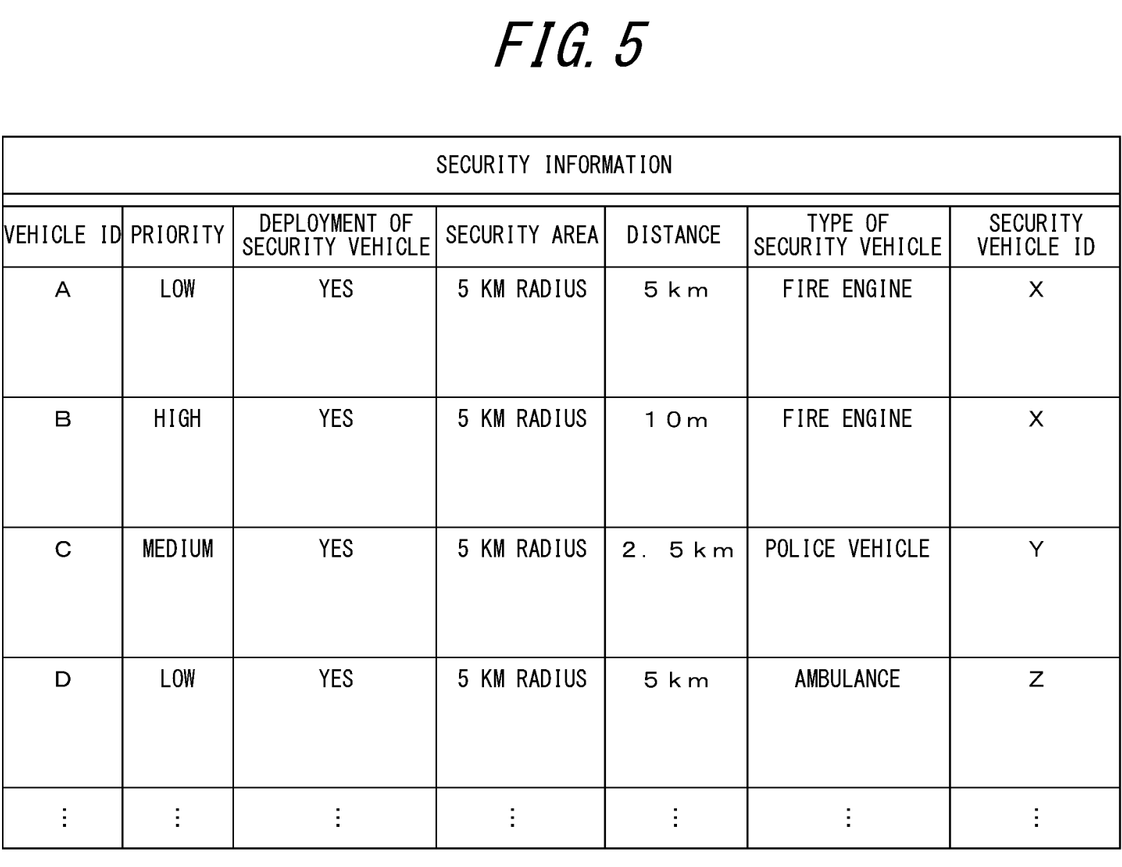
FIG. 5 illustrates an example of security information determined by the controller of FIG. 2.

FIG. 5 is a diagram illustrating an example of the security information determined by the controller 13 of FIG. 2. Referring to FIG. 5, an example of the security information determined by the controller 13 will be described in greater detail.

The controller 13 determines, in advance or in real time, the security priority for the vehicle 20 to be "low" based on the vehicle 20 with the vehicle ID "A" having a "low" degree of risk. The controller 13 determines, in advance or in real time, deployment of the security vehicle 30 to be "yes" and the security area of the security vehicle 30 to be a "5 km radius" based on the determined hazard information. The controller 13 determines, in advance or in real time, the distance between the vehicle 20 and the security vehicle 30 in the security area to be "5 km" based on the degree of risk being "low" and the security priority being "low" for the vehicle 20. The controller 13 determines, in advance or in real time, that the type of the security vehicle 30 to be deployed is a "fire engine" based on the type of hazardous event being a "fire". The controller 13 determines, in advance or in real time, to deploy the security vehicle 30 with security vehicle ID "X" to the corresponding vehicle 20.

The controller 13 determines, in advance or in real time, the security priority for the vehicle 20 with the vehicle ID "B" to be "high" based on the vehicle 20 having a "high" degree of risk. The controller 13 determines, in advance or in real time, deployment of the security vehicle 30 to be "yes" and the security area of the security vehicle 30 to be a "5 km radius" based on the determined hazard information. The controller 13 determines, in advance or in real time, the distance between the vehicle 20 and the security vehicle 30 in the security area to be "10 m" based on the degree of risk being "high" and the security priority being "high" for the vehicle 20. The controller 13 determines, in advance or in real time, that the type of the security vehicle 30 to be deployed is a "fire engine" based on the type of hazardous event being a "fire". The controller 13 determines, in advance or in real time, to deploy the security vehicle 30 with security vehicle ID "X" to the corresponding vehicle 20.

The controller 13 determines, in advance or in real time, the security priority for the vehicle 20 with the vehicle ID "C" to be "medium" based on the vehicle 20 having a "medium" degree of risk. The controller 13 determines, in advance or in real time, deployment of the security vehicle 30 to be "yes" and the security area of the security vehicle 30 to be a "5 km radius" based on the determined hazard information. The controller 13 determines, in advance or in real time, the distance between the vehicle 20 and the security vehicle 30 in the security area to be "2.5 km" based on the degree of risk being "medium" and the security priority being "medium" for the vehicle 20. The controller 13 determines, in advance or in real time, that the type of the security vehicle 30 to be deployed is a "police vehicle" based on the type of hazardous event being "trouble between occupants". The controller 13 determines, in advance or in real time, to deploy the security vehicle 30 with security vehicle ID "Y" to the corresponding vehicle 20.

The controller 13 determines, in advance or in real time, the security priority for the vehicle 20 with the vehicle ID "D" to be "low" based on the vehicle 20 having a "low" degree of risk. The controller 13 determines, in advance or in real time, deployment of the security vehicle 30 to be "yes" and the security area of the security vehicle 30 to be a "5 km radius" based on the determined hazard information. The controller 13 determines, in advance or in real time, the distance between the vehicle 20 and the security vehicle 30 in the security area to be "5 km" based on the degree of risk being "low" and the security priority being "low" for the vehicle 20. The controller 13 determines, in advance or in real time, that the type of the security vehicle 30 to be deployed is an "ambulance" based on the type of hazardous event being an "accident involving an instrument". The controller 13 determines, in advance or in real time, to deploy the security vehicle 30 with security vehicle ID "Z" to the corresponding vehicle 20.

The controller 13 receives, from the security vehicle 30 via the communication interface 11, various driving information pertaining to the security vehicle 30 and acquired by the controller 34 of the security vehicle 30. For example, the controller 13 receives the travel information for the security vehicle 30 from the security vehicle 30 via the communication interface 11. The controller 13 transmits control information for executing vehicle control for the security vehicle 30 to the security vehicle 30 via the communication interface 11.

For example, the controller 13 transmits the acquired vehicle information for the vehicle 20 to the security vehicle 30 via the communication interface 11. For example, controller 13 transmits hazard information determined based on the vehicle information to the security vehicle 30 via the communication interface 11.

For example, the controller 13 transmits security information for guarding the vehicle 20, as determined based on the vehicle information, to the security vehicle 30 via the communication interface 11. For example, the controller 13 transmits the determined deployment information as security information to the security vehicle 30 via the communication interface 11.

For example, the controller 13 judges in real time whether the degree of risk exceeds a predetermined level based on the internal information included in the class information. When the degree of risk is judged to exceed the predetermined level, the controller 13 transmits control information, for moving the security vehicle 30 to the position of the vehicle 20 in accordance with travel information for the vehicle 20, to the security vehicle 30 via the communication interface 11. When the degree of risk is judged to exceed "medium" and become "high", for example, the controller 13 transmits control information, for moving the security vehicle 30 to the position of the vehicle 20 in accordance with travel information for the vehicle 20, to the security vehicle 30 via the communication interface 11. When the degree of risk represented by a numerical value within any appropriate numerical range is judged to exceed a threshold, for example, the controller 13 transmits control information, for moving the security vehicle 30 to the position of the vehicle 20 in accordance with travel information for the vehicle 20, to the security vehicle 30 via the communication interface 11.

When it is determined that the degree of risk exceeds a predetermined level, for example, the controller 13 determines route information for guiding the vehicle 20 to a predetermined location as the security information. The controller 13 transmits the determined route information to the vehicle 20 via the communication interface 11. As used herein, the "predetermined location" includes, for example, any location that is appropriately determined in accordance with a predetermined level related to degree of risk.

When the predetermined level related to degree of risk is set high, for example, the probability of occurrence of a hazardous event is very high when the degree of risk exceeds the predetermined level. At this time, the predetermined location therefore includes a location where the hazardous event can be immediately eliminated, for example, when the hazardous event envisioned in relation to the hazard information actually occurs. More specifically, when the type of hazardous event is "fire", the predetermined location includes a fire department. When the type of hazardous event is "trouble between occupants", the predetermined location includes a police station. When the type of hazardous event is "accident involving an instrument", the predetermined location includes a hospital.

When the predetermined level related to degree of risk is set low, for example, the probability of occurrence of a hazardous event is not very high even if the degree of risk exceeds the predetermined level. At this time, the predetermined location therefore includes any location somewhat distant from a location where the hazardous event can be eliminated, for example, when the hazardous event envisioned in relation to the hazard information actually occurs. More specifically, when the type of hazardous event is "fire", the predetermined location includes any location somewhat distant from the fire department. When the type of hazardous event is "trouble between occupants", the predetermined location includes any location somewhat distant from a police station. When the type of hazardous event is "accident involving an instrument", the predetermined location includes any location somewhat distant from a hospital.

For example, the controller 13 judges whether a hazardous event envisioned in relation to hazard information has actually occurred based on the internal information included in the class information. When it is judged that a hazardous event has actually occurred, the controller 13 transmits control information, to the security vehicle 30 via the communication interface 11, to control the security vehicle 30 so as to eliminate the hazardous event at the position of the vehicle 20.

The controller 13 is not limited to the above examples. The controller 13 may determine a preventative measure, to avoid the occurrence of the hazardous event envisioned in relation to the hazard information, based on the acquired internal information and may notify the vehicle 20 of the determined preventative measure.

Figure 6:
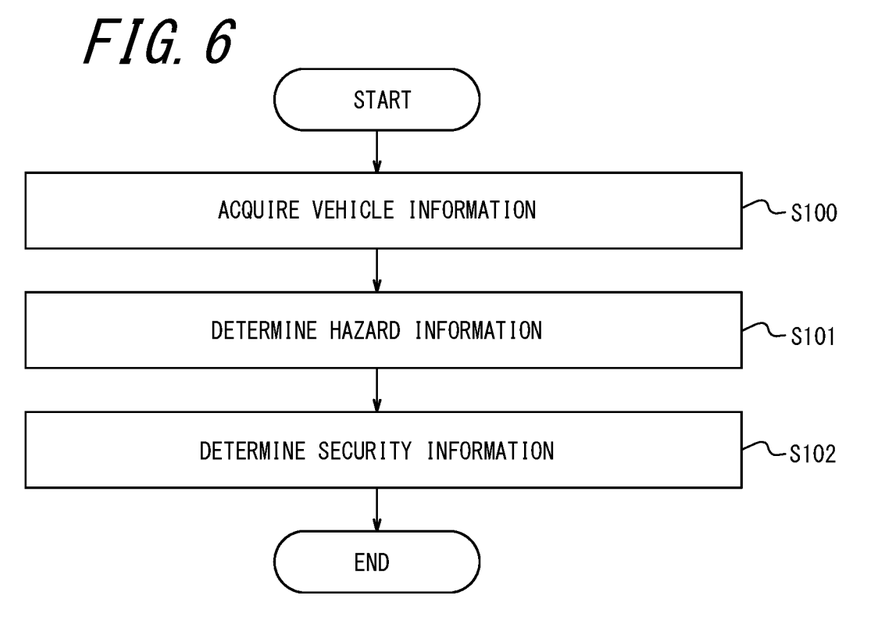
FIG. 6 is a flowchart illustrating a first example of an information processing method executed by the information processing apparatus of FIG. 1.

Next, an information processing method executed by the controller 13 of the information processing apparatus 10 according to an embodiment is described with reference to FIGS. 6 through 10. FIG. 6 is a flowchart illustrating a first example of an information processing method executed by the information processing apparatus 10 of FIG. 1.

In step S100, the controller 13 acquires the vehicle information, which includes the class information for the class held in the vehicle 20 and the travel information for the vehicle 20.

In step S101, the controller 13 determines the hazard information, attributable to holding of the class, based on the vehicle information acquired in step S100.

In step S102, the controller 13 determines the security information for guarding the vehicle 20 based on the hazard information determined in step S101.

Figure 7:
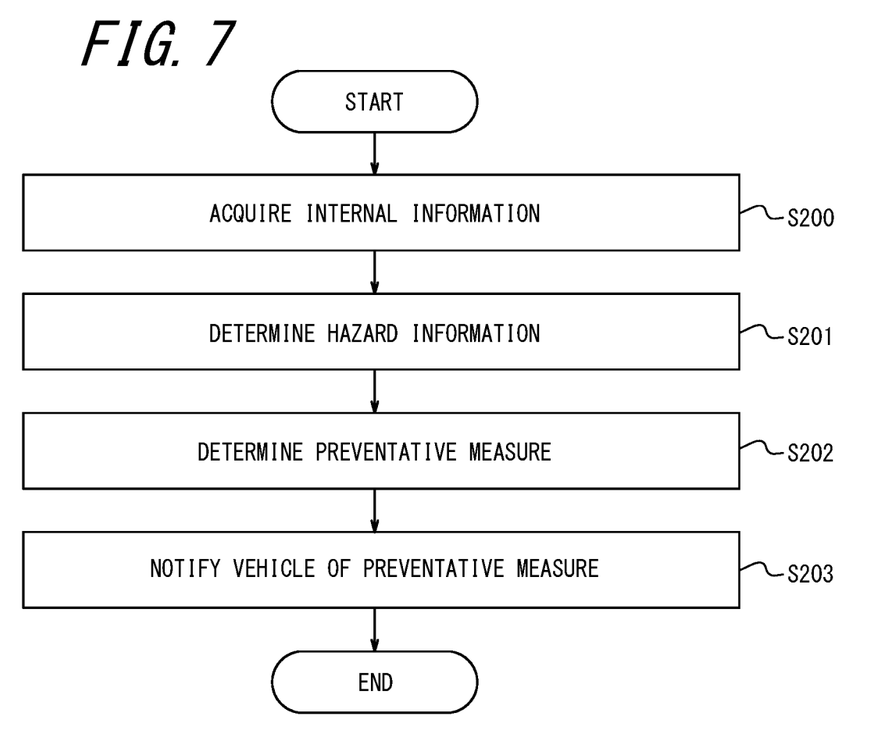
FIG. 7 is a flowchart illustrating a second embodiment of an information processing method executed by the information processing apparatus of FIG. 1.
Figure 8:
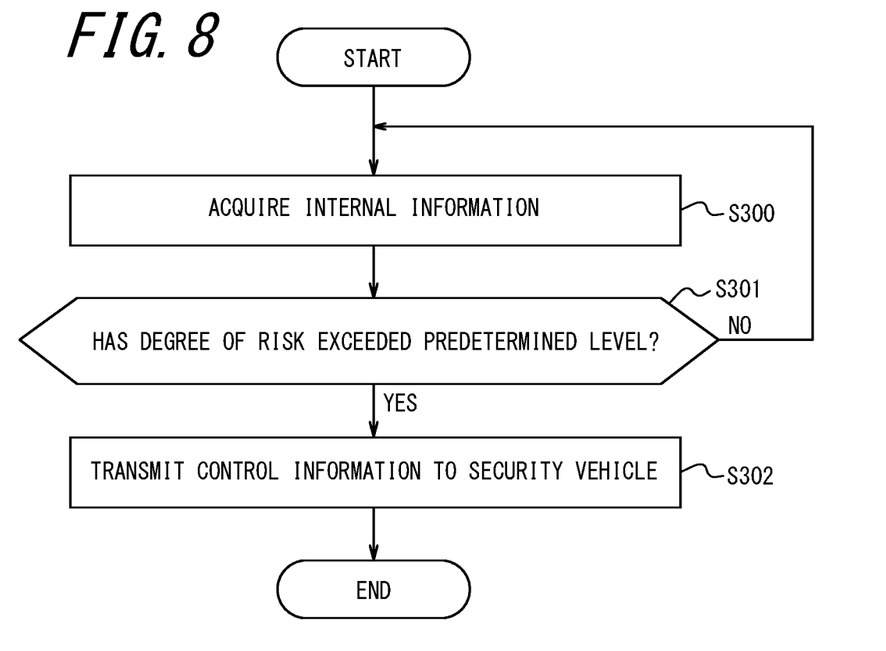
FIG. 8 is a flowchart illustrating a third example of an information processing method executed by the information processing apparatus of FIG. 1.
Figure 9:
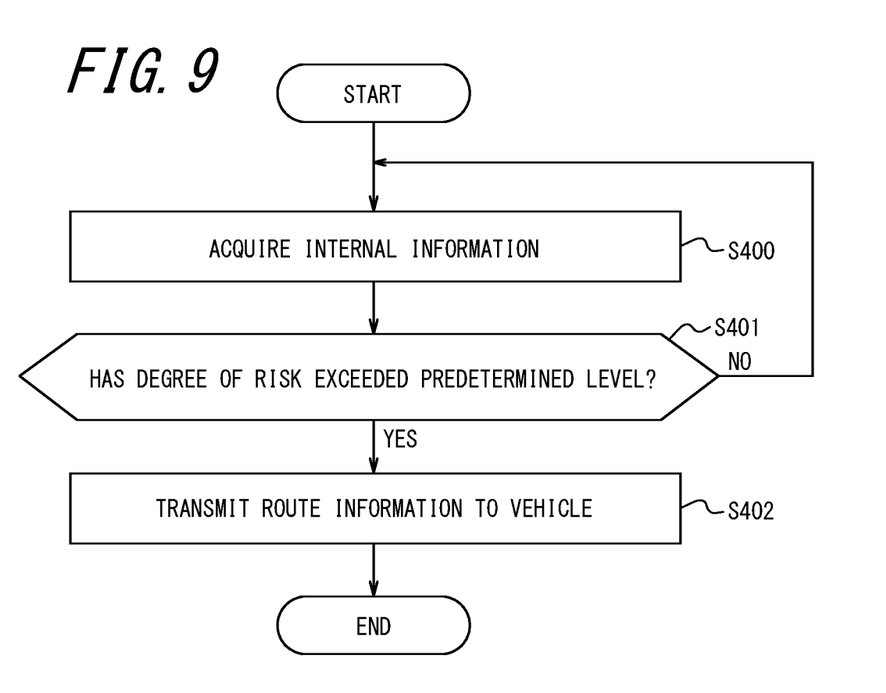
FIG. 9 is a flowchart illustrating a fourth example of an information processing method executed by the information processing apparatus of FIG. 1.

The flowcharts in FIGS. 7 through 9 illustrate the control flow by the controller 13 when the information processing apparatus 10 acquires real-time internal information, for example, as the class information. FIG. 7 is a flowchart illustrating a second example of an information processing method executed by the information processing apparatus 10 of FIG. 1.

In step S200, the controller 13 acquires the internal information for the vehicle 20 in which the class is held from the vehicle 20 in real time as the class information.

In step S201, the controller 13 determines the hazard information, attributable to holding of the class, based on the internal information acquired in step S200.

In step S202, the controller 13 determines a preventative measure, to avoid the occurrence of the hazardous event envisioned in relation to the hazard information determined in step S201, based on the internal information acquired in step S200.

In step S203, the controller 13 notifies the vehicle 20 of the preventative measure determined in step S202.

FIG. 8 is a flowchart illustrating a third example of the information processing method executed by the information processing apparatus 10 of FIG. 1.

In step S300, the controller 13 acquires the internal information for the vehicle 20 in which the class is held from the vehicle 20 in real time as the class information.

In step S301, the controller 13 judges whether the degree of risk determined in real time based on the internal information acquired in step S300 exceeds a predetermined level. When it is judged that the degree of risk exceeds the predetermined level, the controller 13 executes the processing of step S302. When it is judged that the degree of risk does not exceed the predetermined level, the controller 13 executes the processing of step S300 again.

When it is judged in step S301 that the degree of risk exceeds the predetermined level, the controller 13 transmits control information, for moving the security vehicle 30 to the position of the vehicle 20 in accordance with the travel information for the vehicle 20, to the security vehicle 30 via the communication interface 11 in step S302.

FIG. 9 is a flowchart illustrating a fourth example of an information processing method executed by the information processing apparatus 10 of FIG. 1.

In step S400, the controller 13 acquires the internal information for the vehicle 20 in which the class is held from the vehicle 20 in real time as the class information.

In step S401, the controller 13 judges whether the degree of risk determined in real time based on the internal information acquired in step S400 exceeds a predetermined level. When it is judged that the degree of risk exceeds the predetermined level, the controller 13 executes the processing of step S402. When it is judged that the degree of risk does not exceed the predetermined level, the controller 13 executes the processing of step S400 again.

When it is judged in step S401 that the degree of risk exceeds the predetermined level, the controller 13 determines route information for guiding the vehicle 20 to a predetermined location as the security information and transmits the determined route information to the vehicle 20 via the communication interface 11 in step S402.

Figure 10:
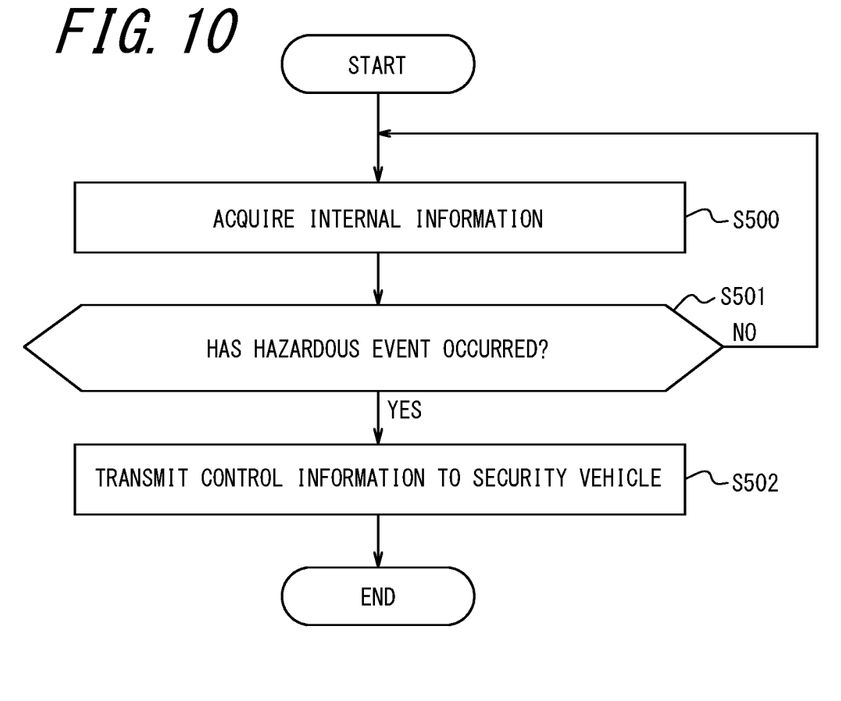
FIG. 10 is a flowchart illustrating a fifth example of an information processing method executed by the information processing apparatus of FIG. 1.

FIG. 10 is a flowchart illustrating a fifth example of an information processing method executed by the information processing apparatus 10 of FIG. 1.

In step S500, the controller 13 acquires the internal information for the vehicle 20 in which the class is held from the vehicle 20 in real time as the class information.

In step S501, the controller 13 judges whether a hazardous event envisioned in relation to the hazard information determined in real time based on the internal information acquired in step S500 has actually occurred. When it is judged that a hazardous event has occurred, the controller 13 executes the processing of step S502. When it is judged that no hazardous event has occurred, the controller 13 executes the processing of step S500 again.

When it is judged in step S501 that a hazardous event has occurred, the controller 13 transmits control information, for controlling the security vehicle 30 to eliminate the hazardous event at the position of the vehicle 20, to the security vehicle 30 via the communication interface 11 in step S502.

Figure 11:
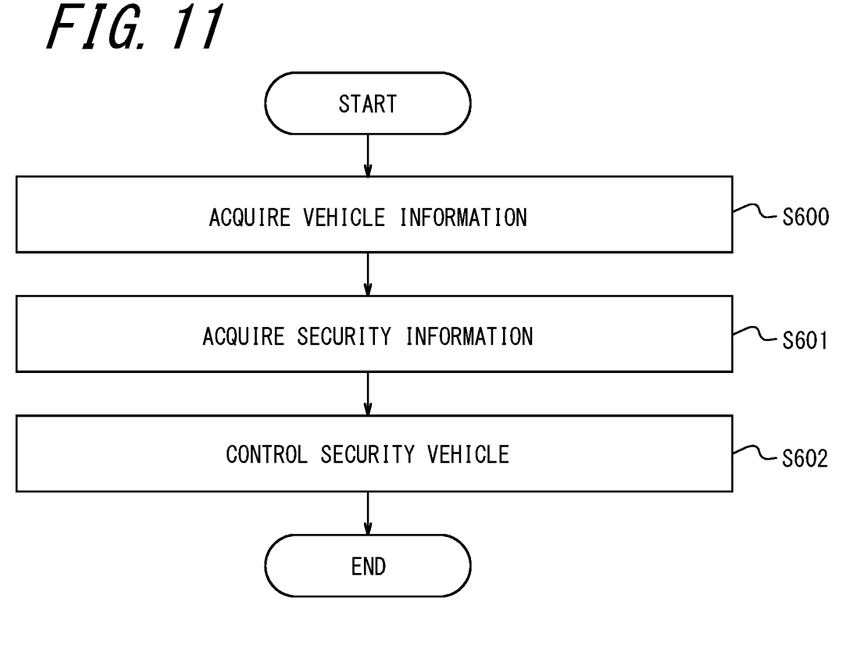
FIG. 11 is a flowchart illustrating an example of an information processing method executed by the security vehicle of FIG. 1.

Next, with reference to FIG. 11, the information processing method executed by the controller 34 of the security vehicle 30 according to an embodiment is described. FIG. 11 is a flowchart illustrating an example of the information processing method executed by the security vehicle 30 of FIG. 1.

In step S600, the controller 34 acquires vehicle information including the class information for the class held in the vehicle 20 and the travel information for the vehicle 20.

In step S601, the controller 34 acquires the security information determined by the information processing apparatus 10.

In step S602, the controller 34 controls the security vehicle 30, based on the control information acquired from the information processing apparatus 10, to guard the targeted vehicle 20 in accordance with the vehicle information acquired in step S600 and the security information acquired in step S601.

The above-described embodiment can ensure the safety of the class held in the vehicle 20. For example, by acquiring the vehicle information and determining the hazard information based on the acquired vehicle information, the information processing apparatus 10 can determine information related to a potential hazardous event attributable to holding of the class before the hazardous event occurs. In addition, the information processing apparatus 10 can contribute to the security of the vehicle 20 prior to the actual occurrence of a hazardous event by determining security information based on the hazard information. This ensures the safety of teachers and students participating in classes held in the vehicle 20, enabling the lecturers and students to feel safe when participating in a class held in the vehicle 20.

The information processing apparatus 10 can contribute to the deployment of the security vehicle 30 for the vehicle 20 by determining the deployment information for the security vehicle 30 to be deployed as security information based on the travel information for the vehicle 20. By deploying the security vehicle 30 for the vehicle 20, the information processing apparatus 10 can control the security vehicle 30 to move the security vehicle 30 to the position of the vehicle 20 and eliminate the hazardous event when the hazardous event actually occurs. For example, by the security vehicle 30 moving to the position of the vehicle 20, a hazardous event can be eliminated even if the hazardous event makes it difficult for the vehicle 20 to travel, preventing the vehicle 20 from moving to a location where the hazardous event can be eliminated.

The information processing apparatus 10 can determine the likelihood that a hazardous event will occur as objective information by determining, based on the acquired class information, the degree of risk attributable to holding of the class as hazard information. For example, this enables the occupants of the vehicle 20 and the security vehicle 30 who have acquired the hazard information to learn of the possibility that a hazardous event will occur in the vehicle 20 by way of an objective index. The occupants of the vehicle 20 can therefore relax and concentrate on participating in the class when they recognize that the hazard level is low, for example. The occupants of the vehicle 20 may, for example, take some action to prevent the occurrence of a hazardous event when they recognize that the degree of risk is high. In addition, the occupants of the security vehicle 30 can guard the vehicle 20 without becoming too tense when they recognize that the degree of risk is low, for example. The occupants of the security vehicle 30 may, for example, guard the vehicle 20 with a greater sense of tension when they recognize that the degree of risk is high, for example.

In accordance with the determined degree of risk, the information processing apparatus 10 can determine the priority of each vehicle 20 among a plurality of vehicles 20 to be guarded as the security information, thereby determining the need for security of each vehicle 20 as objective information. This also enables the information processing apparatus 10 to control the security vehicle 30 to prioritize the guarding of a vehicle 20 with high priority, for example, when a single security vehicle 30 is assigned to guard more than one vehicle 20. This improves the effectiveness with which the security vehicle 30 guards a plurality of vehicles 20.

The information processing apparatus 10 can acquire real-time changes in the conditions in the vehicle 20 by acquiring, in real-time, internal information for the vehicle 20 in which the class is being held from the vehicle 20 as the class information. This also enables the information processing apparatus 10 to control the security vehicle 30 in response to real-time changes in the conditions inside the vehicle 20 by, for example, controlling the security vehicle 30 to move to the position of the vehicle 20 and eliminate the hazardous event at the position of the vehicle 20. The information processing apparatus 10 may also control the vehicle 20 in response to real-time changes in the conditions inside the vehicle 20 by, for example, guiding the vehicle 20 to a predetermined location based on the determined route information.

The information processing apparatus 10 can reduce the probability of a hazardous event actually occurring in the vehicle 20 by determining a preventative measure based on the acquired internal information and notifying the vehicle 20 of the determined preventative measure. Based on the notified preventative measure, the occupants of the vehicle 20 can also take actions to prevent hazardous events from actually occurring. The occurrence of hazardous events in the vehicle 20 can also be prevented in this way.

The information processing apparatus 10 can guide the vehicle 20 appropriately in accordance with the degree of risk by determining route information that guides the vehicle 20 to a predetermined location as the security information, when the degree of risk exceeds a predetermined level. For example, when the predetermined level related to degree of risk is set to a high level, the information processing apparatus 10 can guide the vehicle 20 to a location where the hazardous event can be immediately eliminated if the hazardous event actually occurs. For example, when the predetermined level related to degree of risk is set to a low value, the information processing apparatus 10 can guide the vehicle 20 to any location somewhat distant from where the hazardous event can be eliminated if the hazardous event actually occurs.

The security vehicle 30 ensures the safety of the class held in the vehicle 20 by guarding the vehicle 20 in accordance with the acquired vehicle information and security information. For example, the security vehicle 30 may guard the vehicle 20 prior to the actual occurrence of a hazardous event based on security information determined by the information processing apparatus 10 prior to the occurrence of the hazardous event. This ensures the safety of teachers and students participating in classes held in the vehicle 20, enabling the teachers and students to feel safe when participating in classes held in the vehicle 20.

By guarding the vehicle 20, the security vehicle 30 can move to the position of the vehicle 20 and eliminate a hazardous event when the hazardous event actually occurs. For example, even if a hazardous event makes it difficult for the vehicle 20 to travel, preventing the vehicle 20 from moving to a location where the hazardous event can be eliminated, the security vehicle 30 can eliminate the hazardous event by moving to the position of the vehicle 20.

When the security vehicle 30 moves or is stationary in accordance with travel information for the vehicle 20 so as to remain within the security area, the security vehicle 30 can move to the position of the vehicle 20 within a predetermined time if, for example, the degree of risk exceeds a predetermined level or a hazardous event actually occurs. This increases the sense of security of the teachers and students participating in the class held in the vehicle 20.

When the security vehicle 30 moves or is stationary so as to maintain a certain distance between the vehicle 20 and the security vehicle 30 in the security area, the security vehicle 30 can move to the position of the vehicle 20 more quickly if, for example, the degree of risk exceeds a predetermined level or a hazardous event actually occurs. This further increases the sense of security of the teachers and students participating in class held in the vehicle 20.

The security vehicle 30 can guard the vehicle 20 at an appropriate distance for the security priority by moving or remaining stationary to maintain a distance, between the vehicle 20 and the security vehicle 30, corresponding to the security priority. For example, when the security priority varies in real time, the security vehicle 30 can guard the vehicle 20 while appropriately adjusting the distance from the vehicle 20 to accommodate changes in the security priority.

The security vehicle 30 can prepare for the occurrence of a hazardous event by moving to the position of the vehicle 20 in accordance with the travel information for the vehicle 20 when the degree of risk exceeds a predetermined level. By moving in advance to the position of the vehicle 20, the security vehicle 30 can immediately eliminate a hazardous event if the hazardous event actually occurs.

While the present disclosure has been described with reference to the drawings and examples, it should be noted that various modifications and revisions may be implemented by those skilled in the art based on the present disclosure. Accordingly, such modifications and revisions are included within the scope of the present disclosure. For example, functions or the like included in each configuration, each step, or the like, may be rearranged without logical inconsistency, and a plurality of configurations, steps, or the like can be combined into one, or divided.

For example, a portion of the processing operations executed on the information processing apparatus 10 in the above embodiment may be executed on at least one of the vehicle 20 and the security vehicle 30. At least a portion of the processing operations executed on at least one of the vehicle 20 and the security vehicle 30 may be executed on the information processing apparatus 10.

For example, a configuration in which a general purpose electronic device such as a smartphone, a computer, or the like may be caused to function as the information processing apparatus 10 according to the embodiment described above is possible. Specifically, a program in which processes for realizing the functions of the information processing apparatus 10 or the like according to the embodiment are written may be stored in a memory of the electronic device, and the program may be read and executed by a processor of the electronic device. Accordingly, an embodiment of the present disclosure can also be implemented as a program executable by a processor. Alternatively, the disclosure according to an embodiment can also be implemented as a non-transitory computer readable medium storing a program executable by a single processor or a plurality of processors to cause the information processing apparatus 10 or the like according to the embodiment to execute the functions. It is to be understood that these are also included within the scope of the present disclosure.

For example, in the above embodiment, the vehicle 20 and the security vehicle 30 have been described as being autonomously driven vehicles, but this example is not limiting. The vehicle 20 and the security vehicle 30 need not be autonomously driven vehicles. When the vehicle 20 and the security vehicle 30 are not autonomously driven vehicles, a route based on received route information and control information may be outputted to the driver to assist with driving along the route.

For example, the information processing apparatus 10 described in the above embodiment may be mounted on the vehicle 20 or the security vehicle 30. At this time, the information processing apparatus 10 may communicate information directly to the vehicle 20 or the security vehicle 30 without passing through the network 40.

For example, in the above embodiment, the security vehicle 30 has been described as being deployed for the vehicle 20, but this example is not limiting. The information processing system 1 need not include the security vehicle 30, and the security vehicle 30 need not be deployed for the vehicle 20. Even in such cases, the information processing apparatus 10 can appropriately control the vehicle 20 according to the degree of risk by, for example, determining the route information for guiding the vehicle 20 to a predetermined location as the security information, when the degree of risk exceeds a predetermined level. This enables guarding of the vehicle 20.

For example, in the above embodiment, the information processing apparatus 10 has been described as determining the route information for guiding the vehicle 20 to a predetermined location as the security information when the degree of risk exceeds a predetermined level, but this example is not limiting. For example, if the vehicle 20 is moving or stationary near a location where a hazardous event can be immediately eliminated when the hazardous event actually occurs, the information processing apparatus 10 need not determine the route information even if the degree of risk exceeds a predetermined level.

For example, in the above embodiment, a certain distance between the vehicle 20 and the security vehicle 30 in the security area has been described as being maintained, but this example is not limiting. The security vehicle 30 may be stationary outside the security zone or anywhere within the security area, or the security vehicle 30 may be traveling along any route outside or inside the security zone.

For example, in the above embodiment, the distance between the vehicle 20 and the security vehicle 30 has been described as being determined in accordance with the security priority, but this example is not limiting. The information processing apparatus 10 may determine the distance between the vehicle 20 and the security vehicle 30 independent of the degree of risk and the security priority.

For example, in the above embodiment, the security vehicle 30 has been described as moving to the position of the vehicle 20 in accordance with the travel information for the vehicle 20 when the degree of risk exceeds a predetermined level, but this example is not limiting. For example, when the security vehicle 30 is moving or stationary at a position where a hazardous event can be immediately eliminated if the hazardous event actually occurs, the security vehicle 30 need not move to the position of the vehicle 20 in accordance with the travel information for the vehicle 20 if the hazard exceeds a predetermined level.

The invention claimed is:

1. An information processing apparatus for guarding at least one vehicle, the information processing apparatus comprising a controller configured to:
   acquire vehicle information including class information for a class to be held in the at least one vehicle and travel information for the at least one vehicle;
   determine hazard information attributable to holding of the class based on the acquired vehicle information;
   determine security information for guarding the at least one vehicle based on the determined hazard information;
   determine, based on the acquired class information, a degree of risk attributable to the holding of the class as the hazard information;
   acquire internal information for the at least one vehicle where the class is held from the at least one vehicle in real time as the class information; and
   determine, based on the acquired international information, a preventative measure for avoiding occurrence of a hazardous event envisioned in relation to the hazard information, and to notify the at least one vehicle of the determined preventative measure.

2. The information processing apparatus of claim 1, wherein the controller is configured to determine, as the security information, deployment information for a security vehicle to be deployed to guard the at least one vehicle based on the travel information for the at least one vehicle.

3. The information processing apparatus of claim 1, wherein the at least one vehicle includes a plurality of vehicles, and the controller is configured to determine, as the security information, a priority of each vehicle among the plurality of vehicles for guarding the plurality of vehicles in accordance with the determined degree of risk.

4. The information processing apparatus of claim 1, wherein the controller is configured to determine route information for guiding the at least one vehicle to a predetermined location as the security information, when the degree of risk determined in real time based on the acquired internal information exceeds a predetermined level.

5. An information processing system comprising:
   the information processing apparatus of claim 1;
   the at least one vehicle, which is configured to transmit the vehicle information to the information processing apparatus; and
   a security vehicle to be deployed to guard the at least one vehicle based on the travel information for the at least one vehicle.

6. A non-transitory computer readable medium storing a program configured to cause an information processing apparatus for guarding at least one vehicle, to execute operations comprising:
   acquiring vehicle information including class information for a class to be held in the at least one vehicle and travel information for the at least one vehicle;
   determining hazard information attributable to holding of the class based on the acquired vehicle information; and
   determining security information for guarding the at least one vehicle based on the determined hazard information,
   wherein the determining the hazard information comprises determining, based on the acquired class information, a degree of risk attributable to the holding of the class,
   wherein the acquiring the vehicle information comprises acquiring internal information for the at least one vehicle where the class is held from the at least one vehicle in real time as the class information, and
   wherein the operations further comprise:
   determining, based on the acquired internal information, a preventative measure for avoiding occurrence of a hazardous event envisioned in relation to the hazard information; and
   notifying the at least one vehicle of the determined preventative measure.

7. The non-transitory computer readable medium of claim 6, wherein the determining the security information comprises determining deployment information for a security vehicle to be deployed to guard the at least one vehicle based on the travel information for the at least one vehicle.

8. The non-transitory computer readable medium of claim 6, wherein the at least one vehicle includes a plurality of vehicles, and the determining the security information comprises determining a priority of each vehicle among the plurality of vehicles for guarding the plurality of vehicles in accordance with the determined degree of risk.

9. The non-transitory computer readable medium of claim 6, wherein the determining the security information comprises determining route information for guiding the at least one vehicle to a predetermined location when the degree of risk determined in real time based on the acquired internal information exceeds a predetermined level.

10. A security vehicle for guarding at least one vehicle subject to security using an information processing apparatus, the security vehicle comprising a controller configured to:
  acquire vehicle information including class information for a class to be held in the at least one vehicle and travel information for the at least one vehicle;
  acquire security information for guarding the at least one vehicle, determined by the information processing apparatus based on the vehicle information; and
  control the security vehicle to guard the at least one vehicle in accordance with the acquired vehicle information and the acquired security information.

11. The security vehicle of claim 10, wherein the controller is configured to cause the security vehicle to move or to stop in accordance with the travel information for the at least one vehicle so that the security vehicle is included in a security area of the security vehicle centered on the at least one vehicle, the security area being included in the acquired security information.

12. The security vehicle of claim 11, wherein the controller is configured to cause the security vehicle to move or to stop, to maintain a distance between the at least one vehicle and the security vehicle within the security area, the distance being included in the acquired security information.

13. The security vehicle of claim 12, wherein the controller is configured to cause the security vehicle to move or to stop, to maintain the distance determined by the information processing apparatus in accordance with a security priority included in the security information.

14. The security vehicle of claim 10, wherein the controller is configured to cause the security vehicle to move to a position of the at least one vehicle in accordance with the travel information for the at least one vehicle when a degree of risk attributable to holding of the class exceeds a predetermined level, wherein the degree of risk is determined in real time by the information processing apparatus based on internal information for the at least one vehicle where the class is held, and the internal information is included in the class information.

* * * * *